Dec. 6, 1932.                J. ROBINSON                1,890,411
                  AUTOMATIC TRAIN PIPE CONNECTER HEAD
                    Original Filed June 19, 1929
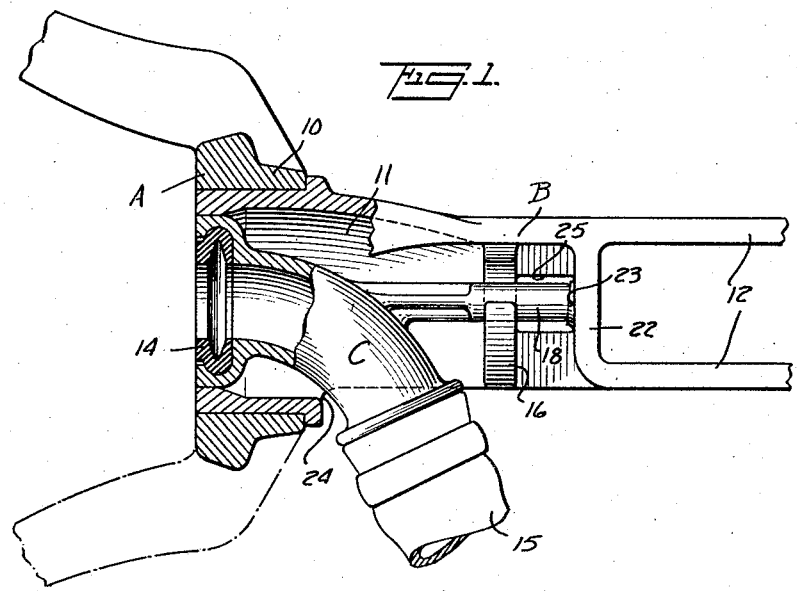
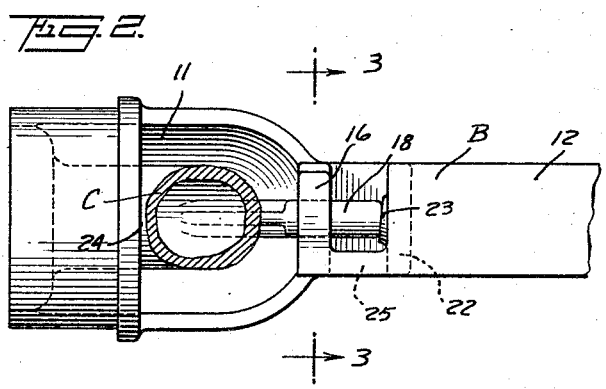
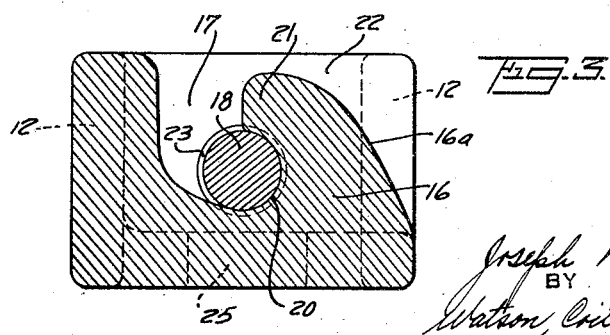
INVENTOR
Joseph Robinson
BY
Watson, Crit, Morse & Grindle
ATTORNEY Patented Dec. 6, 1932

1,890,411

UNITED STATES PATENT OFFICE

JOSEPH ROBINSON, OF NEW YORK, N. Y.

AUTOMATIC TRAIN PIPE CONNECTER HEAD

Application filed June 19, 1929, Serial No. 372,187. Renewed February 17, 1932.

This invention relates to improvements in automatic train pipe connecters, and more particularly to means for removing defective gaskets between the faces of connecter heads while such heads remain coupled. The invention is an improvement on the construction shown in my co-pending application Serial #357,853 filed April 24th, 1929, and one object is to simplify the construction and eliminate all movable parts in the locking arrangement for anchoring the conduit removably in place either at the center of the coupling head as shown, or at either end thereof.

In the drawing Figure 1 is a sectional plan view of my improvement. In this view a part of the coupling head is shown;

Figure 2 is a sectional side view of the construction shown in Figure 1. In this view a part of the conduit C is broken away, and Figure 3 is a front sectional view on the line 3—3 of Figure 2.

It will be understood that any desired type of coupling head, whether pin and funnel or the wing type, may be used with my improvement. I illustrate a coupling head A of the wing type. It will also be understood that the carrier or member B of my improvement may be secured to the coupling head in any desired manner, and that it is also a carrier or support for the conduit C as well as for the coupling head A, and that it may be attached to the head at the center or either end thereof. In the present embodiment of my invention I provide the coupling head with a shank 10 into which I press or otherwise secure the forward hollow end or chamber 11 of the member B. However, such forward end of the member may be riveted or bolted to the head along the general lines of my co-pending application Serial #418,233 filed October 20th, 1920.

The member B includes a pair of rearwardly extending spaced straps 12 arranged to span or extend through the connecter bracket (not shown). The straps may of course be eliminated and a single stem or projection, or other means, provided for mounting the member B on the bracket. Into the hollow forward end of the member I removably mount the tubular conduit C, the forward end of which extends through the coupling head and carries an expansible gasket 14 and curves laterally out of one side of the hollow end or chamber 11 of the member. The usual metallic or rubber train pipe hose 15 is suitably mounted on the rear end of the conduit. To secure the conduit C in place, I provide the member B with a suitable anchor lug 16 which preferably lies in the vertical plane and extends transversely of the member and is provided with an inclined guiding face 16ª, Figure 3. This lug is formed integral with the member, but it may be made separately thereof, and it is slotted at 17, Figure 3, to receive the projection 18 which extends rearwardly away from the conduit C, and is preferably formed integral therewith. The rear part of the projection rests and is movable in the seat or undercut portion 20 of the lug 16. A transversely extending hook or finger 21 is formed by the aforesaid undercut, and the projection 18 is held beneath this finger and in said seat, by the pressure fluid carried, and by the hose 15, as is later more fully pointed out. A wall or abutment 22 extends transversely of the member B and ties the straps 12 together. Upon its front face I provide this wall with a slightly inclined machined bearing surface or seat 23 against which the machined rear end or face of the projection 18 rests, said face being angled to mate with the bearing 23. To prevent the conduit slipping forward out of the chamber 11, the conduit is curved quite closely around the point 24 of the member B, Figure 1.

When it is desired to remove the conduit from the service position shown in Figure 1, the rear end of the conduit is swung transversely of the member and the projection 18 is forced laterally to disengage it from the hook 21 and bring it in line with the slot 17, whereupon the conduit is tilted upwardly and is then drawn toward the operator and out of the chamber 11. The reverse of this operation will replace the conduit. It will be understood of course that the inclined surface 23, and the mating similar surface on the rear end of the portion 19, facilitate insertion and removal of the conduit C, and also that inasmuch as the weight and resilience of the rubber train pipe hose 15 tends always to draw the conduit C downwardly and towards the hose, that the projection 18 will always be thereby held in locked engagement with the lug 16, as shown especially in Figures 1 and 3. The pressure of the fluid carried tends always to straighten the rubber hose 15 with the result that when the connecters are coupled, and the air pressure turned on, the conduit C will be thereby very firmly held in the interlocked service position shown in the aforesaid figures.

To facilitate exit of foreign substance from the locking mechanism of my improvement, and thus avoid adverse effect thereon from snow and ice, I provide the member B with an opening 25 of considerable size formed in the lower wall of the member and directly under the portion 19 of the lug or projection 18.

I am aware that variations may be made in my improvement, and positive locking means provided to maintain the conduit C in the service position, for which reason I do not wish to be limited to the exact construction shown.

What I claim is:

1. In combination, an automatic train pipe connecter head having an opening therein, a member for supporting the head, said member being provided with a seat and a projection, and a conduit removably mounted in the opening in said head and having a portion hooked into said seat.

2. In combination, an automatic train pipe connecter head, a conduit removably mounted in said head, a supporting member for the conduit, said member being provided with a seat, a projection extending away from said seat, and a part on said conduit adapted to be hooked into said seat to anchor the conduit removably in said head.

3. In combination, an automatic train pipe connecter head having an opening therein, a conduit removably mounted in said head and having a lug, a member for supporting the conduit, said member being provided with a vertically disposed rigid wall slotted to interlockingly receive the lug on said conduit whereby the conduit is removably secured in said coupling head.

4. In combination, an automatic train pipe connecter head having an opening therein, a supporting member attached to the head, said member being provided with a rigid seat formed by perforating a wall of the member, a bearing on the member, a conduit removably mounted in said head and having a lug extending rearwardly from the conduit into interlocked engagement with said perforated wall, the rear end of said lug being seated on said bearing.

5. In combination, an automatic train pipe connecter head having an opening therein, a supporting member attached to the head, said member being provided with a rigid seat formed by perforating a wall of the member, a bearing on the member, a conduit removably mounted in said head and having a lug extending rearwardly from the conduit into interlocked engagement with said perforated wall, the rear end of said lug being seated on said bearing, and means to hold said lug in its said interlocked engagement with said wall.

6. In combination, an automatic train pipe connecter head having an opening therein, a member for supporting the head, said member comprising spaced portions which connect at their forward end with a chamber, a seat on said member including a transversely extending wall integral with the member and perforated to form said seat, a conduit removably mounted in said chamber and having a portion removably anchored on said seat.

7. In combination, an automatic train pipe connecter head, a supporting member attached to the head, said member having a seat which includes a vertically disposed lug, a conduit removably mounted in said head and having a projection resting on said seat and against said vertically disposed lug whereby said conduit is anchored in said head, and an abutment on said member against which said projection bears to prevent undue rearward movement of said conduit.

8. In combination, an automatic train pipe connecter head, a support attached to said head, said support including a seat, a projection extending away from said seat, a conduit removably mounted in said head and having a lug hooked into said seat in abutting relation to said projection, and means for preventing undue forward and rearward movement of the conduit with respect to said head.

9. In combination, an automatic train pipe connecter head, a supporting member attached to said head, a conduit, means for removably anchoring the conduit in said head, said means including a perforated lug on said member and a projection on said conduit adapted to be hooked into said lug, and means tending constantly to hold said projection in the service position.

10. In combination, an automatic train pipe connecter head, a supporting member attached to said head, a conduit, means for removably anchoring the conduit in said head, said means including a perforated lug on said member and a projection on said conduit adapted to be hooked into said lug, and means tending constantly to hold said projection in the service position, said means including a train pipe hose.

11. In combination, an automatic train pipe connecter head, a supporting member attached to the head, said member being provided with a transversely vertically disposed perforated lug, a conduit removably mounted in said head and having a projection hooked into the perforation in said lug from one side of said member.

12. In combination, an automatic train pipe connecter head, a supporting member attached to the head, said member being provided with a transversely vertically disposed perforated lug, a conduit removably mounted in said head and having a projection hooked into the perforation in said lug and movable therein.

13. In combination, a supporting member for an automatic train pipe connecter head, said member at its front end having a chamber therein, a conduit mounted in the chamber of said member with the front end thereof terminating adjacent the front end of said member, said conduit having a projection extending rearwardly therefrom, said member having a part extending transversely thereof at the rear of said chamber and having a recess in which said lug is arranged, said member also having a part against which said projection is adapted to abut to prevent rearward movement of said conduit in said chamber.

14. In combination, a supporting member for an automatic train pipe connecter head, a conduit removably mounted in the front end of said member, said conduit having a projection thereon extending rearwardly therefrom, said member having a part extending transversely thereof at the rear of said conduit, said part having a recess in which said projection is removably inserted, and cooperating means on said projection and member for preventing rearward movement of said conduit.

15. In combination, a supporting member for an automatic train pipe connecter head, said member having a hollow portion at its front end, said hollow portion having an opening on one side, a curved conduit arranged in said hollow portion and extending outwardly through said opening, said conduit being insertable in and removable from said hollow portion through said opening, said conduit having a projection extending from the rear side thereof, said member having a part extending transversely thereof at the rear of said hollow portion and having a recess in which said lug is removably inserted, and cooperating means on said member and conduit for preventing rearward movement of the conduit when mounted in said chamber.

In testimony whereof I hereunto affix my signature.

JOSEPH ROBINSON.